United States Patent
Richmeier

(10) Patent No.: US 9,714,522 B2
(45) Date of Patent: Jul. 25, 2017

(54) TAILGATE PARTY AREA COVERING ASSEMBLY

(71) Applicant: Douglas W. Richmeier, Great Bend, KS (US)

(72) Inventor: Douglas W. Richmeier, Great Bend, KS (US)

( * ) Notice: Subject to any disclaimer, the term of this patent is extended or adjusted under 35 U.S.C. 154(b) by 0 days.

(21) Appl. No.: 14/970,992

(22) Filed: Dec. 16, 2015

(65) Prior Publication Data

US 2016/0177593 A1 Jun. 23, 2016

(51) Int. Cl.
| | |
|---|---|
| *E04H 15/06* | (2006.01) |
| *E04H 15/46* | (2006.01) |
| *B60R 11/00* | (2006.01) |
| *B60D 1/58* | (2006.01) |

(52) U.S. Cl.
CPC ............. *E04H 15/06* (2013.01); *B60D 1/58* (2013.01); *B60R 11/00* (2013.01); *E04H 15/46* (2013.01)

(58) Field of Classification Search
CPC ......... E04H 15/02; E04H 15/06; E04H 15/08; E04H 15/46; E04H 15/58; B60D 1/58; B60D 1/01; B60D 1/075; B60D 1/44; B60R 9/06; B60R 11/00; B60R 2011/004
USPC ............. 135/117, 90, 96, 88.05, 88.08, 88.1, 135/88.13; 296/26.08, 26.09, 161, 163, 296/165; 224/488, 519, 523, 529
See application file for complete search history.

(56) References Cited

U.S. PATENT DOCUMENTS

| | | | | |
|---|---|---|---|---|
| 5,775,560 A | * | 7/1998 | Zahn ......................... | B60R 9/06 224/485 |
| 6,085,954 A | * | 7/2000 | Bloemer ................... | B60R 9/06 224/502 |
| 6,202,909 B1 | * | 3/2001 | Belinky .................... | B60R 9/06 224/522 |
| 6,511,088 B2 | * | 1/2003 | Kahlstorf ............... | B60D 1/075 224/521 |
| 6,913,277 B2 | * | 7/2005 | Mrofka .................... | B60D 1/52 280/491.5 |
| RE38,766 E | * | 8/2005 | Karlsson ................. | E04H 15/06 135/88.13 |
| 7,568,491 B2 | * | 8/2009 | Banfill .................... | E04H 15/06 135/117 |
| 7,607,546 B1 | * | 10/2009 | Hopper ................... | B66C 23/44 212/180 |
| 7,931,040 B2 | * | 4/2011 | Holacka ................ | E04H 15/003 135/117 |

(Continued)

*Primary Examiner* — Winnie Yip
(74) *Attorney, Agent, or Firm* — Kenneth H. Jack; Davis & Jack, L.L.C.

(57) ABSTRACT

A tailgate party area covering assembly incorporating a hitch extender having longitudinal and oppositely longitudinal ends; a bar having lateral and oppositely lateral ends, the bar further having longitudinal and oppositely longitudinal sides; a channel having longitudinal and oppositely longitudinal openings respectively positioned at the bar's longitudinal and oppositely longitudinal sides, the hitch extender being received within the channel; lateral and oppositely lateral columns having upper ends, the lateral and oppositely lateral columns being respectively fixedly attached to the bar's lateral and oppositely lateral ends; and a frame and flexible sheet combination fixedly attached to the lateral and oppositely lateral columns' upper ends, the frame and flexible sheet combination being sized and positioned for covering the tailgate party area.

6 Claims, 11 Drawing Sheets

(56) References Cited

U.S. PATENT DOCUMENTS

| | | | |
|---|---|---|---|
| 8,899,609 B2* | 12/2014 | Mayfield | B60D 1/48 |
| | | | 280/491.1 |
| 9,163,426 B1* | 10/2015 | Seneker | E04H 15/06 |
| 9,175,497 B1* | 11/2015 | Poudrier | B60R 9/06 |
| 2011/0108076 A1* | 5/2011 | Connot | E04H 15/06 |
| | | | 135/88.05 |

* cited by examiner

TAILGATE PARTY AREA COVERING ASSEMBLY

FIELD OF THE INVENTION

This invention relates to auxiliary components attachable to a vehicle's tow hitch receiver. More particularly, this invention relates to such components which are adapted for, in addition to performance of other associated tailgate party facilitating functions, covering or shading a rear vehicle tailgate party area.

BACKGROUND OF THE INVENTION

Commonly known and commonly configured tailgate party area covers and shades are bulky, are mechanically complex, are difficult to assemble, and upon assembly often are insecurely supported against displacement by or damage from high winds.

The instant inventive tailgate party area covering assembly incorporates structures which solve or ameliorate problems discussed above by providing a uniquely configured hitch extender and crossbar combination which multiply functions for shade support, for shade transport, and for auxiliary component attachment and deployment.

BRIEF SUMMARY OF THE INVENTION

A first structural component of the instant inventive tailgate party area covering assembly comprises a hitch extender which has longitudinal and oppositely longitudinal ends, and has lateral and oppositely lateral sides. In a preferred embodiment, the hitch extender is composed of steel, and has an oppositely longitudinal end which is configured substantially identically with the socket end of a common vehicle hitch receiver. Similarly with such common hitch receiver, the assembly's hitch extender component preferably presents lateral and oppositely lateral sheer pin receiving eyes which open the hitch extender's socket at lateral and oppositely sides or walls. In the preferred embodiment, the longitudinal end of the hitch extender is configured as the pin half of a pin and socket joint, the other half of such joint preferably comprising the open socket of the vehicle's rear hitch receiver.

A further structural component of the instant inventive assembly comprises a laterally extending crossbar having lateral and oppositely lateral ends, having longitudinal and oppositely longitudinal faces or sides, and having upwardly facing lands. In the preferred embodiment, the assembly's crossbar component is composed of rigid steel square tubing.

A further structural component or element of the inventive assembly comprises a longitudinally extending hitch extender receiving channel having longitudinal and oppositely longitudinal openings. In the preferred embodiment, such channel's longitudinal and oppositely longitudinal openings are respectively positioned at the crossbar's longitudinal and oppositely longitudinal sides. Such channel is preferably closely fitted to hitch extender's body, and upon assembly of the invention, and the hitch extender component is slidably and nestingly received within the channel.

Further structural components of the instant inventive assembly comprise lateral and oppositely lateral support columns, each such column having upper and lower ends. The lateral and oppositely lateral columns are fixedly, removably, and preferably adjustably attached to the crossbar's lateral and oppositely lateral ends. Such attachments are suitably facilitated by lateral and oppositely lateral "T" configured sleeve joints which are respectively mounted to the crossbar's lateral and oppositely lateral ends. Alternative means for fixedly attaching the lateral and oppositely lateral columns comprise plate and bolt combination fasteners, clevis and bolt combination fasteners, and pin and socket joints.

Further structural components of the instant inventive assembly comprise a frame and flexible sheet combination which is fixedly, removably, and preferably adjustably attached to the upper ends of the lateral and oppositely lateral columns. In a preferred embodiment, such combination's flexible sheet comprises a span of vinyl or fabric which fitted to the preferably square or rectangular dimensions of the frame component. The frame and flexible sheet combination's fixed attachments preferably comprises clevis joint and telescoping triangulating brace combinations. Other commonly known joints adapted for fixed, removably, and adjustable attachment of structural members, including lockable pivot joints and pin and socket joints, are considered to fall with the scope of the invention.

In use of the instant inventive tailgate party area covering assembly, the forward or longitudinal pin of the crossbar channel mounted hitch extender may be nestingly engaged within the open socket of a vehicle's rear hitch receiver, such engagement securely supporting the assembly's crossbar at the rear of the vehicle. The secure crossbar support in turn securely supports both the assembly's lateral and oppositely lateral columns which are secured to the crossbar's lateral and oppositely lateral ends, and the assembly's upwardly attached frame and flexible sheet combination. Such attachments and interconnections of the assembly's structural elements support the frame and flexible sheet combination, allowing the assembly to continue to cover and shade the rear vehicle tailgate party area during high winds.

Accordingly, objects of the instant invention include the provision of a tailgate party area covering assembly which incorporates structures as described above, and which arranges such structures in relation to each other in manners described above, for the performance of the beneficial functions described above.

Other and further objects, benefits, and advantages of the instant invention will become known to those skilled in the art upon review of the Detailed Description which follows, and upon review of the appended drawings.

BRIEF DESCRIPTION OF THE DRAWINGS (FIGS. 1-11 submitted herewith are photographic in nature. Request is made that the drawings be accepted as submitted. In the alternative, the Applicant requests that any requirement for submission of line drawing replacement sheets be held in abeyance until completion of examination.)

Figure 1:
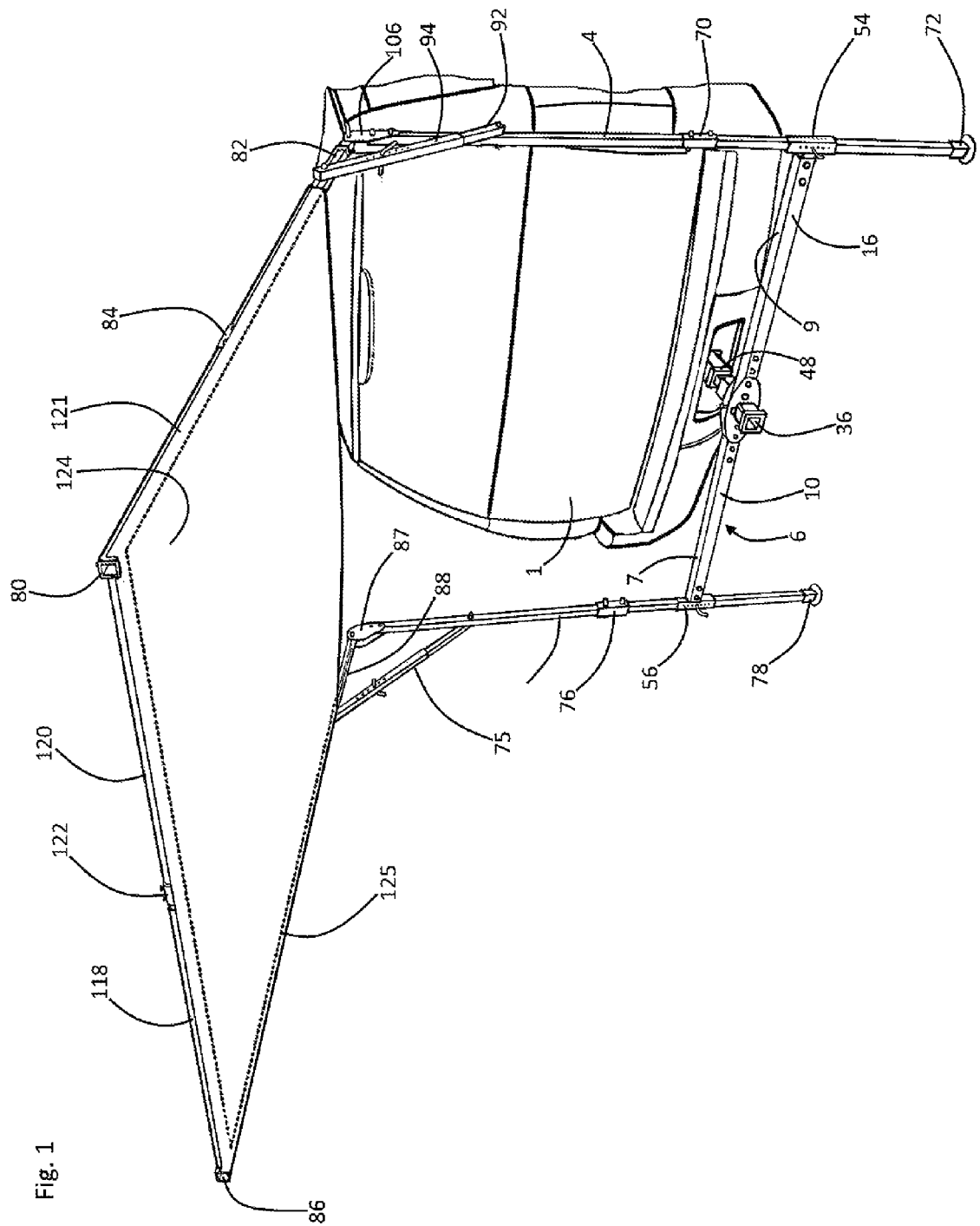
FIG. 1 is a perspective view of a preferred embodiment of the instant inventive tailgate party area covering assembly.
Figure 3:
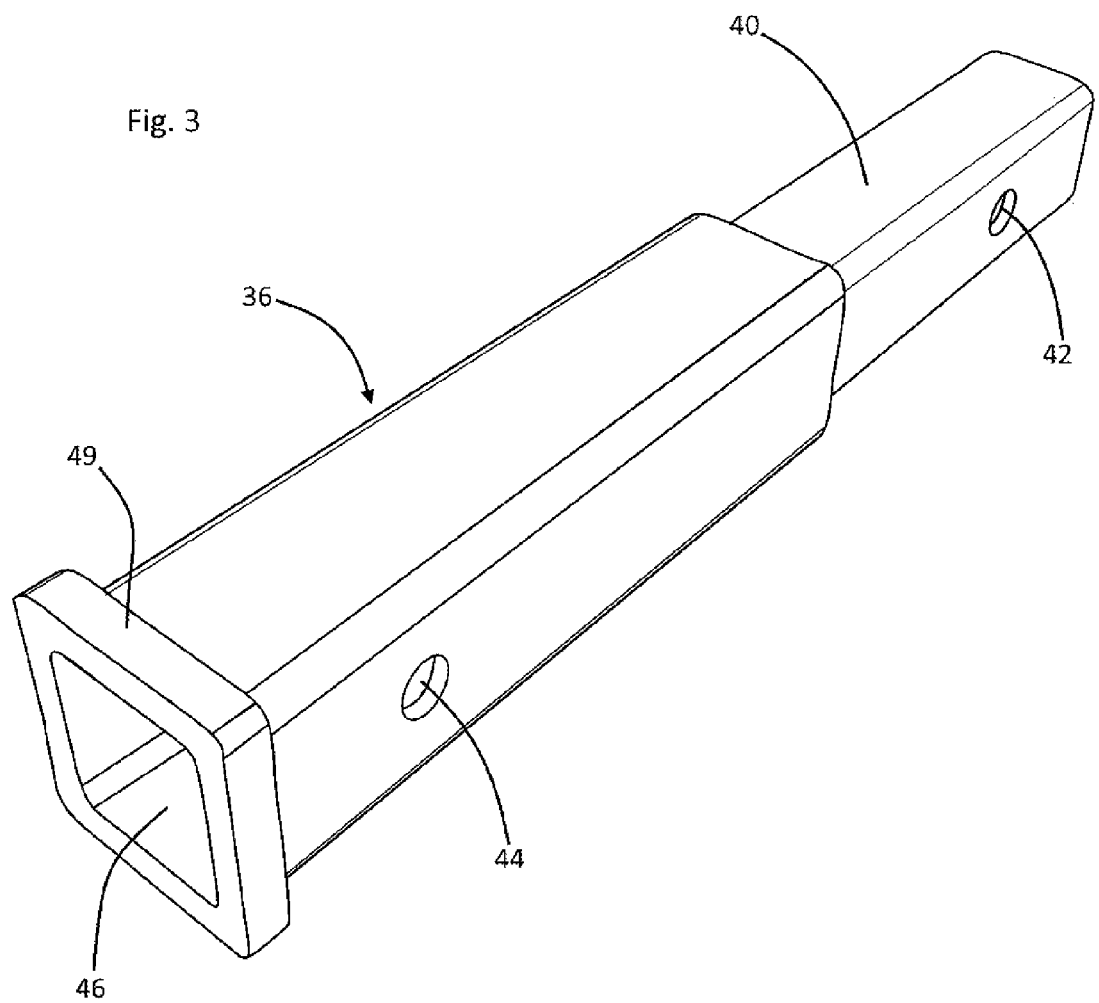

FIG. 3 redepicts structure of FIG. 1, the view of FIG. 3 omitting crossbar, hitch receiver, and vehicle structures.

Figure 4:
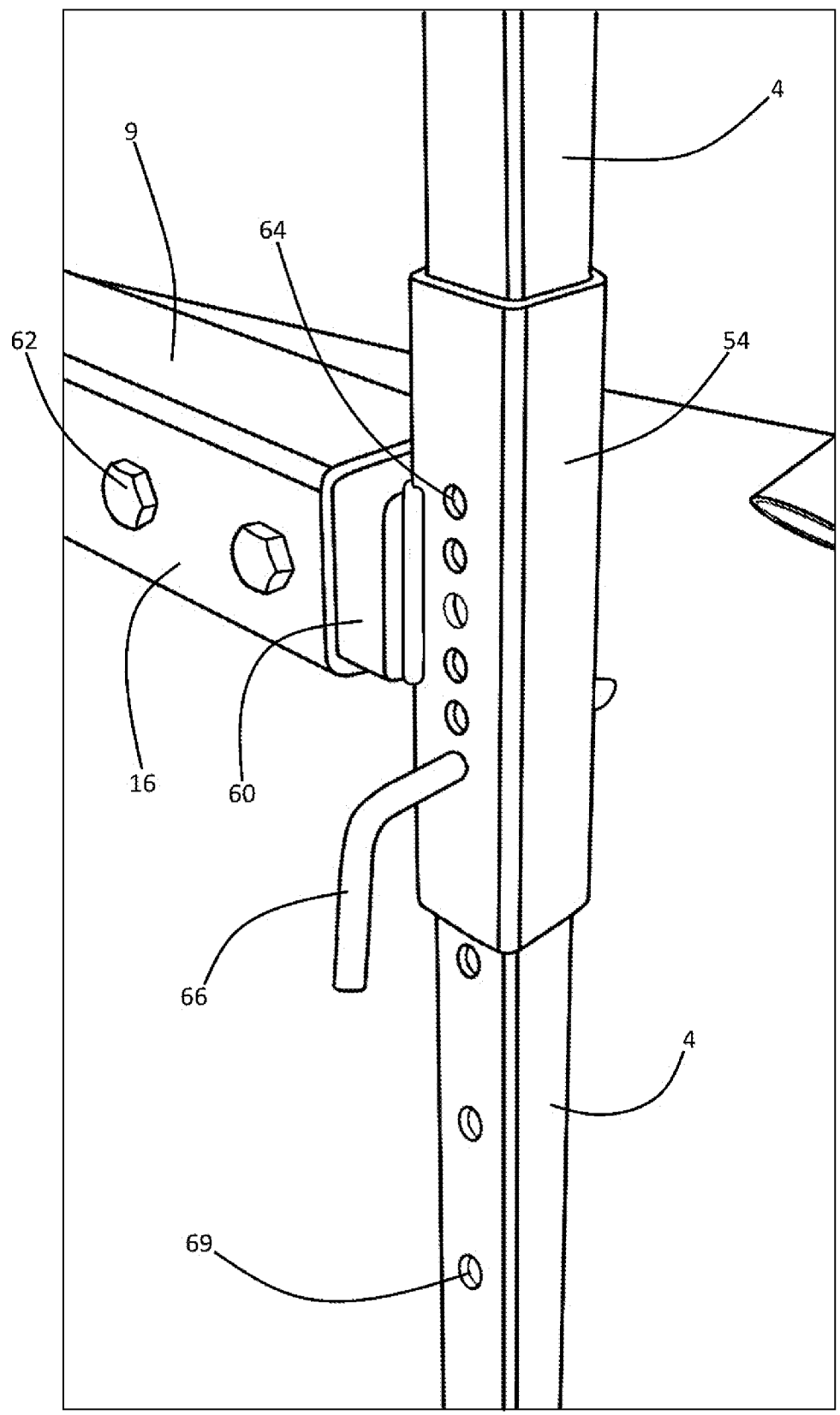

FIG. 4 is an alternative magnified view of a portion of the structure depicted in FIG. 1.

Figure 5:
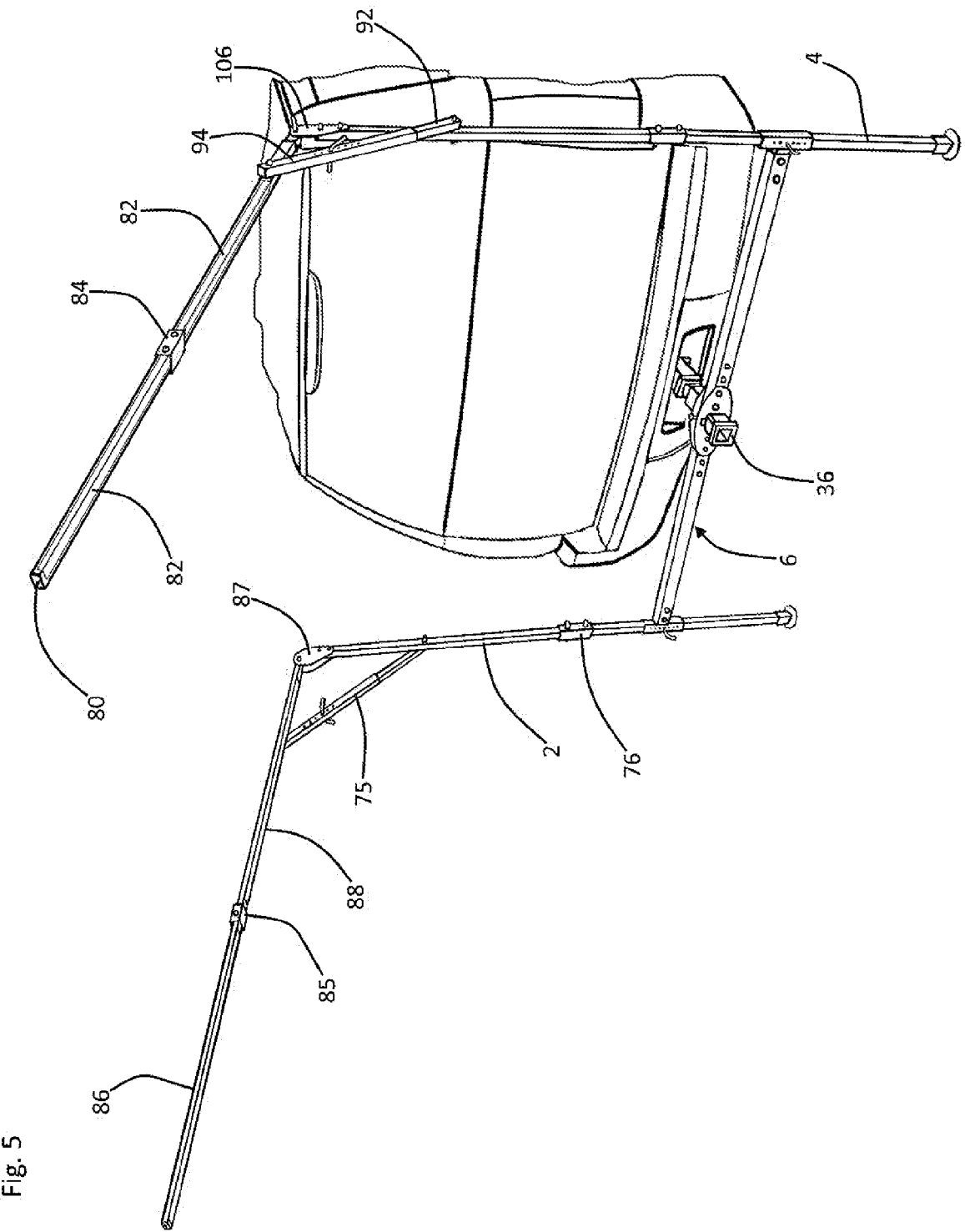

FIG. 5 redepicts the structure of FIG. 1, the view of FIG. 5 showing a flexible sheet component removed.

Figure 6:
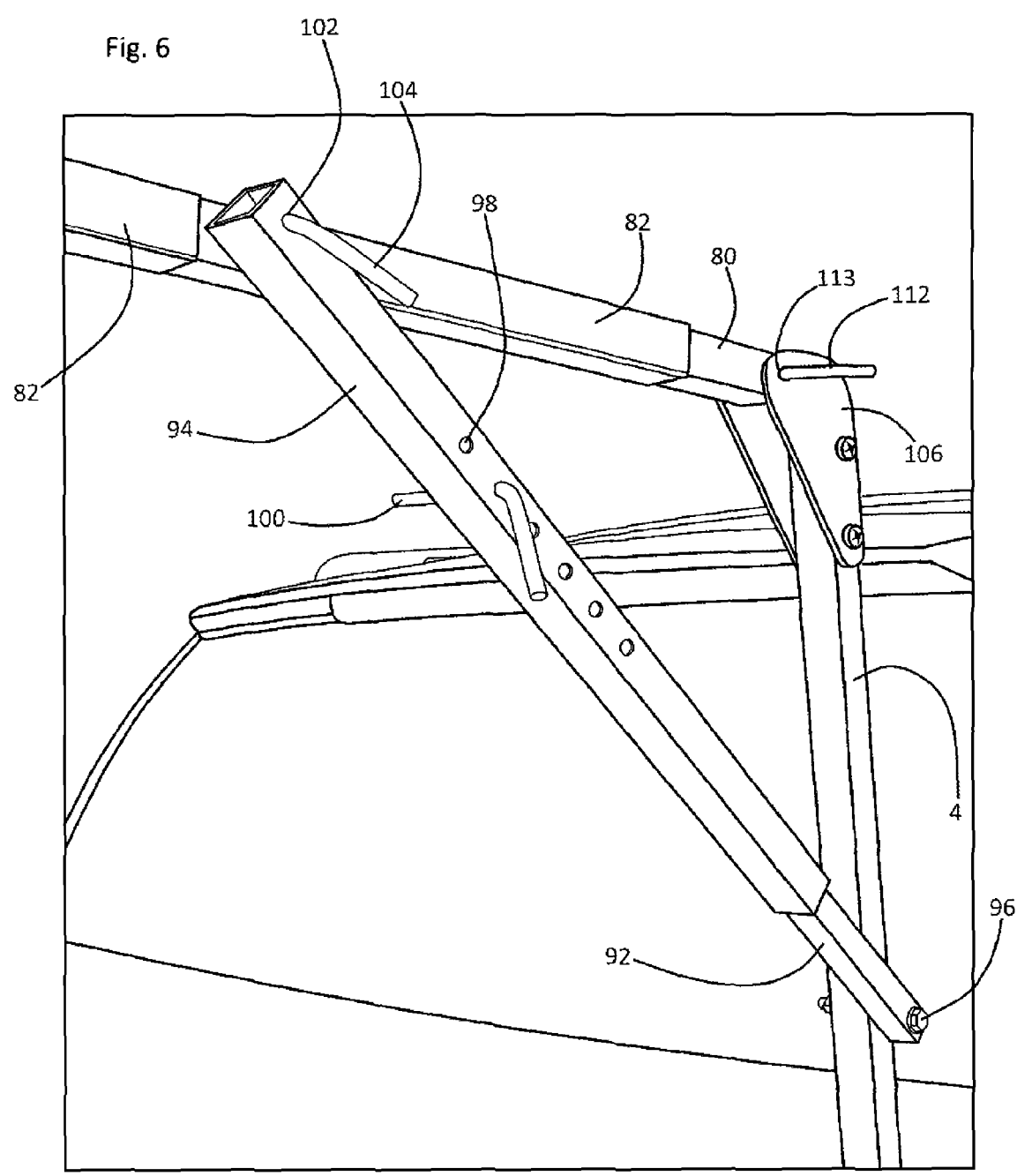

FIG. 6 is a magnified view of a portion of the structure depicted in FIG. 5.

Figure 7:
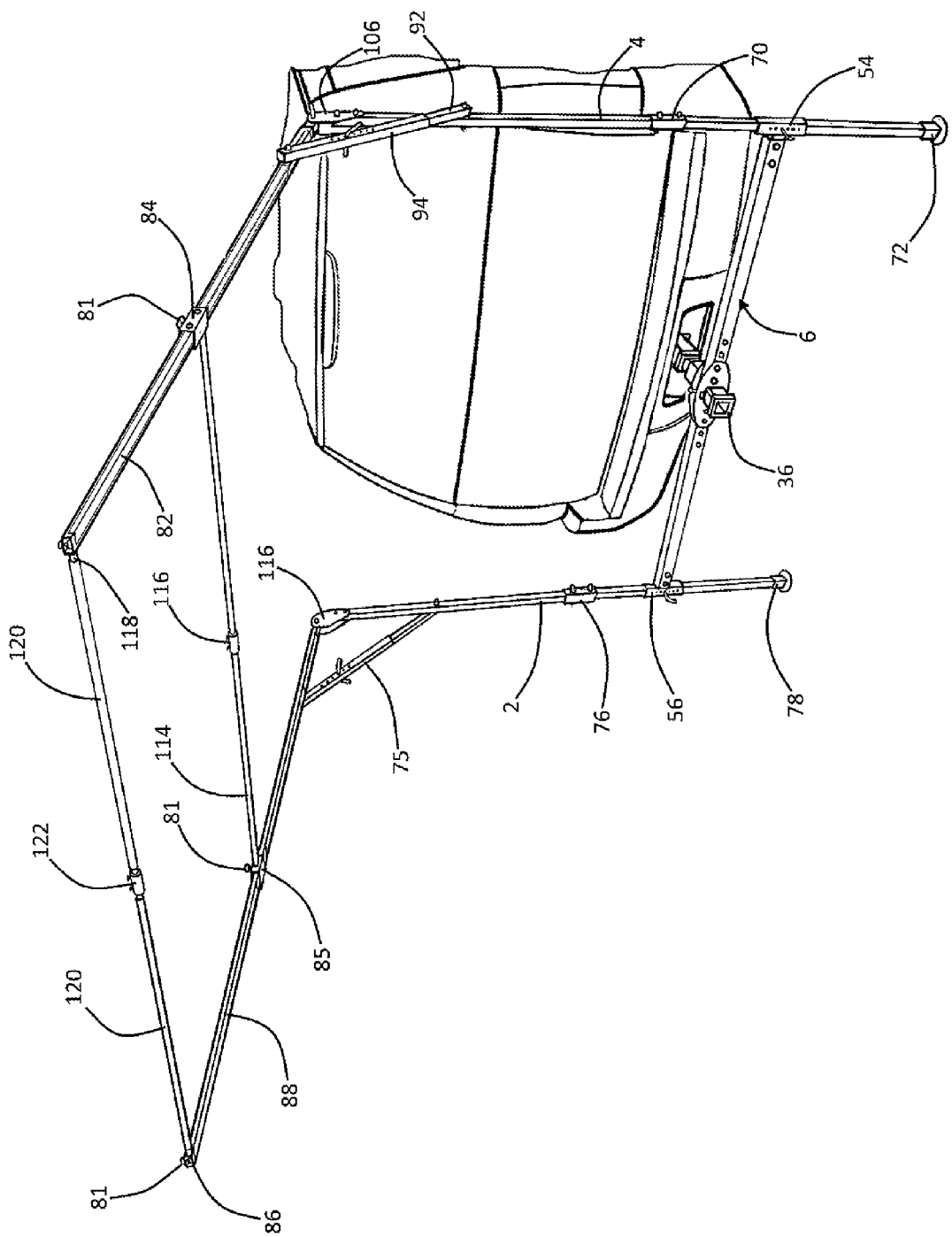

FIG. 7 redepicts the structure of FIG. 5, the view of FIG. 7 additionally showing assembled shade frame components.

Figure 8:
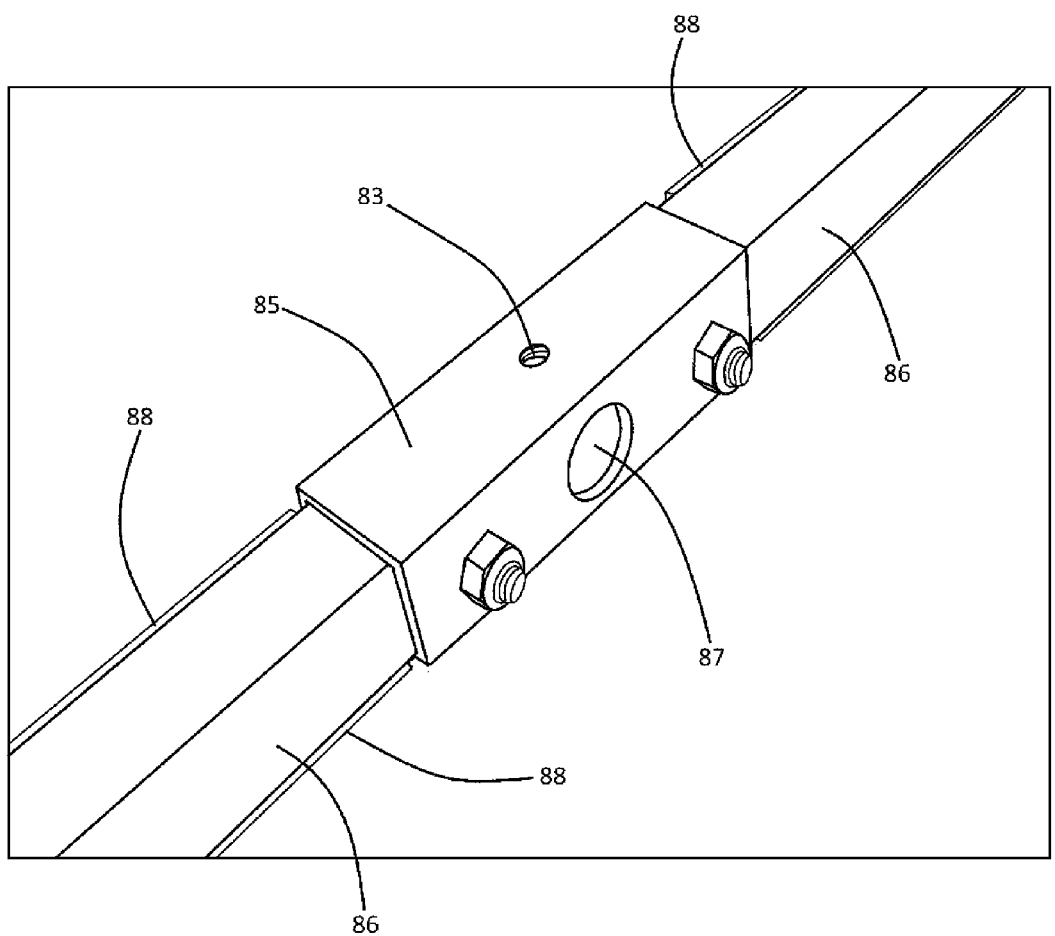

FIG. 8 is magnified view of a portion of the structure depicted in FIG. 5.

Figure 9:
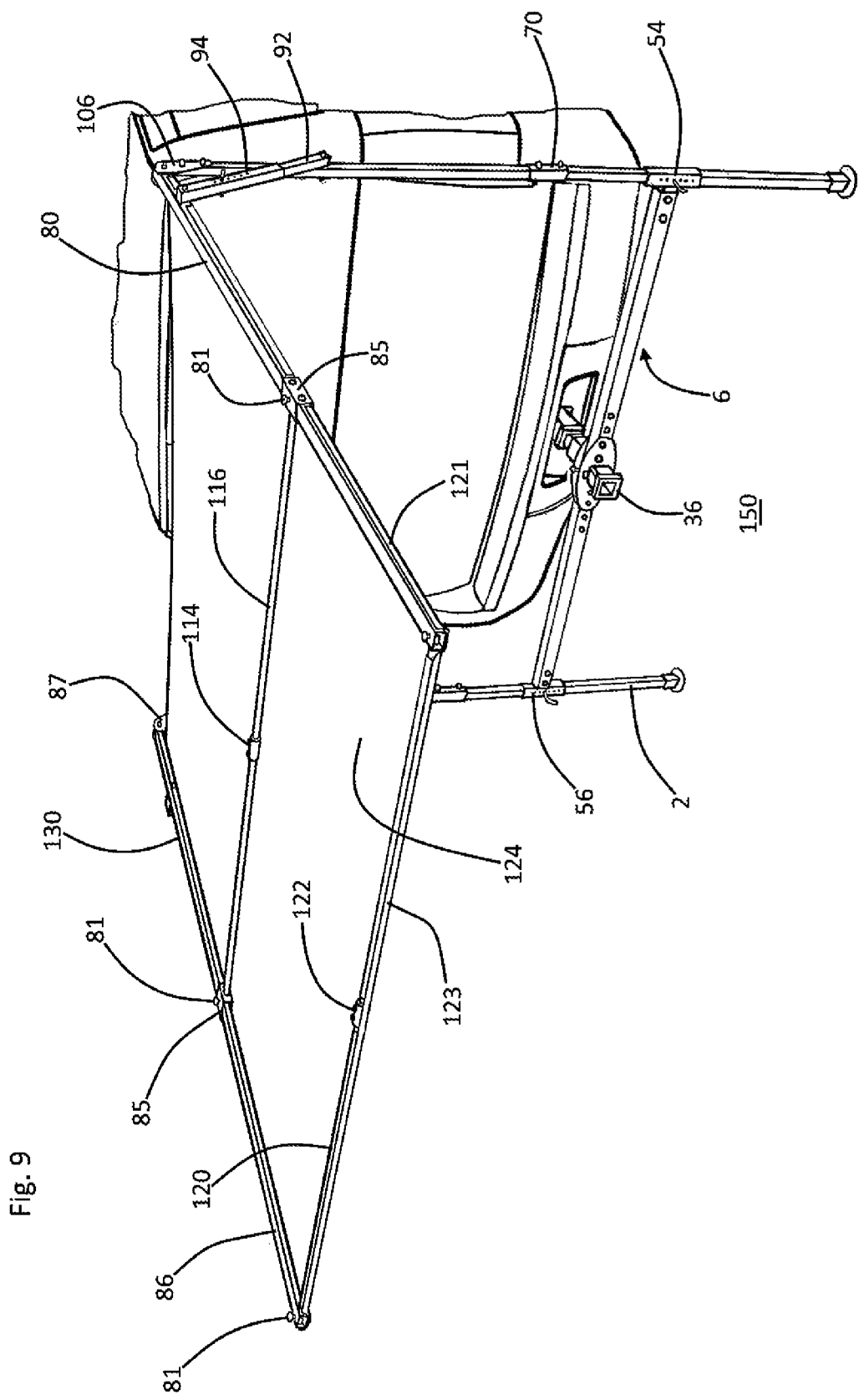

FIG. 9 redepicts the structure of FIG. 7, the view of FIG. 9 additionally showing an attached flexible sheet component.

Figure 10:
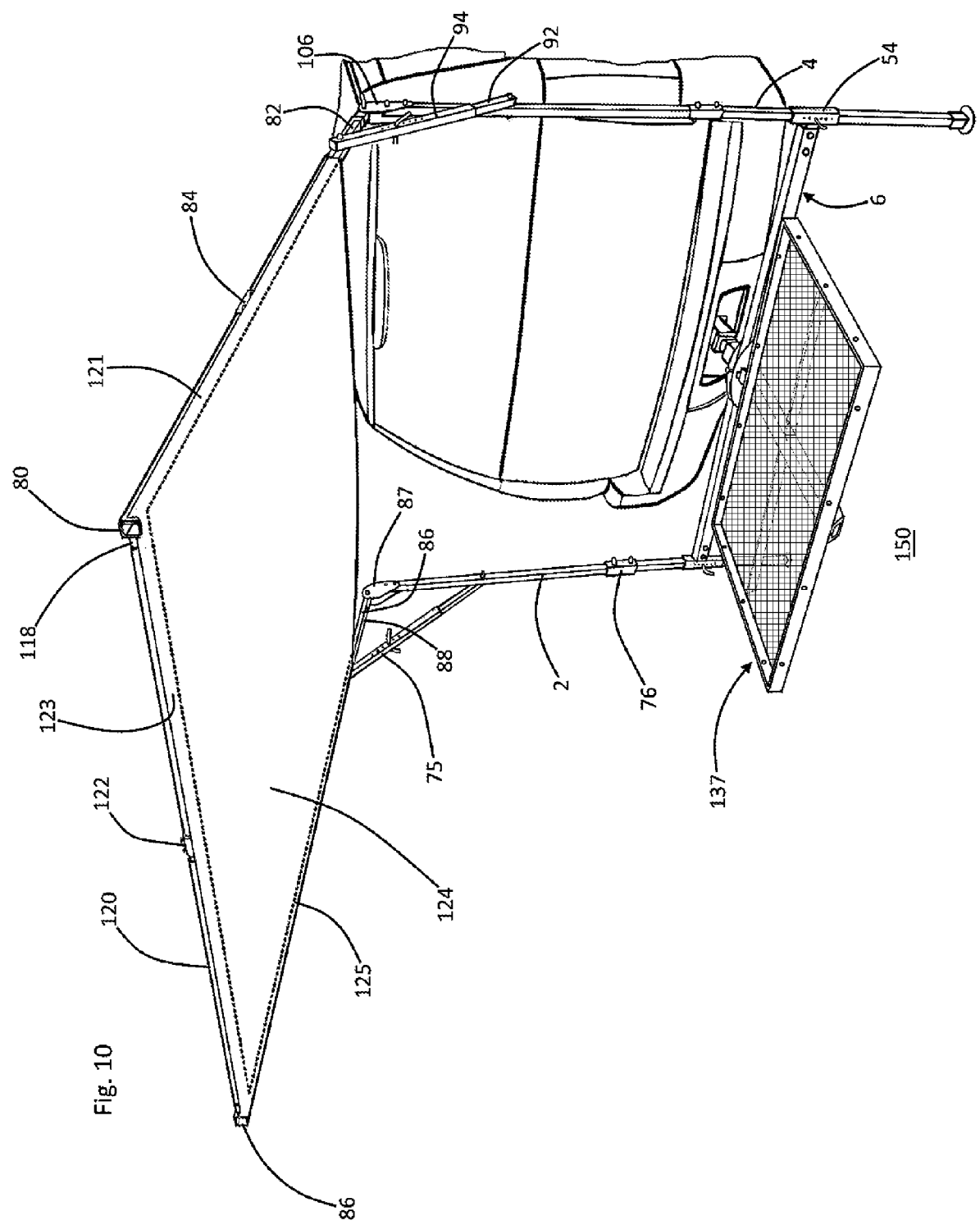

FIG. 10 presents an alternative perspective of the structure depicted in FIG. 9, the view of FIG. 10 further showing a cargo tray auxiliary component.

Figure 11:
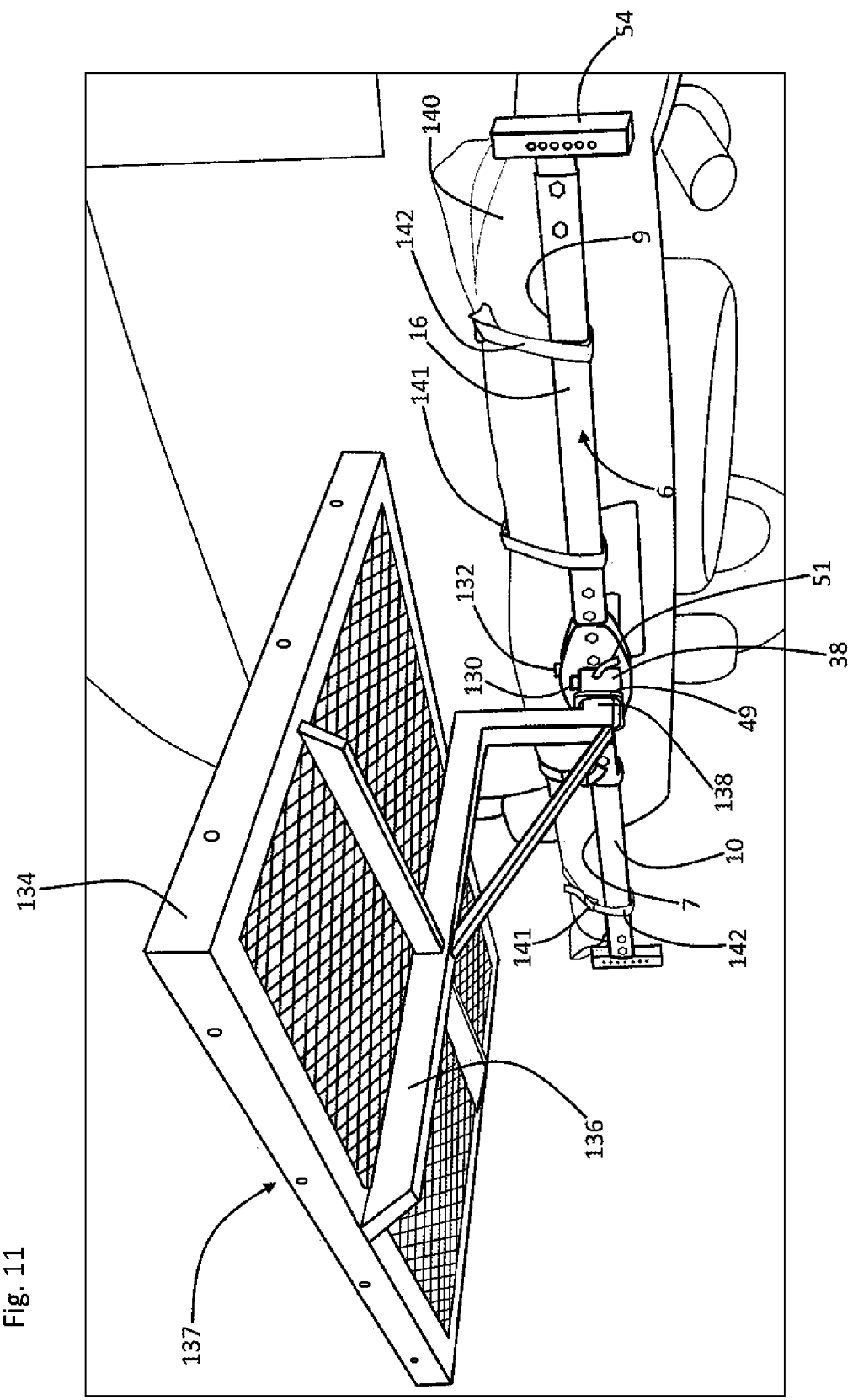

FIG. 11 presents an alternative configuration of the structure depicted in FIG. 10.

DETAILED DESCRIPTION OF PREFERRED EMBODIMENTS

Figure 2:
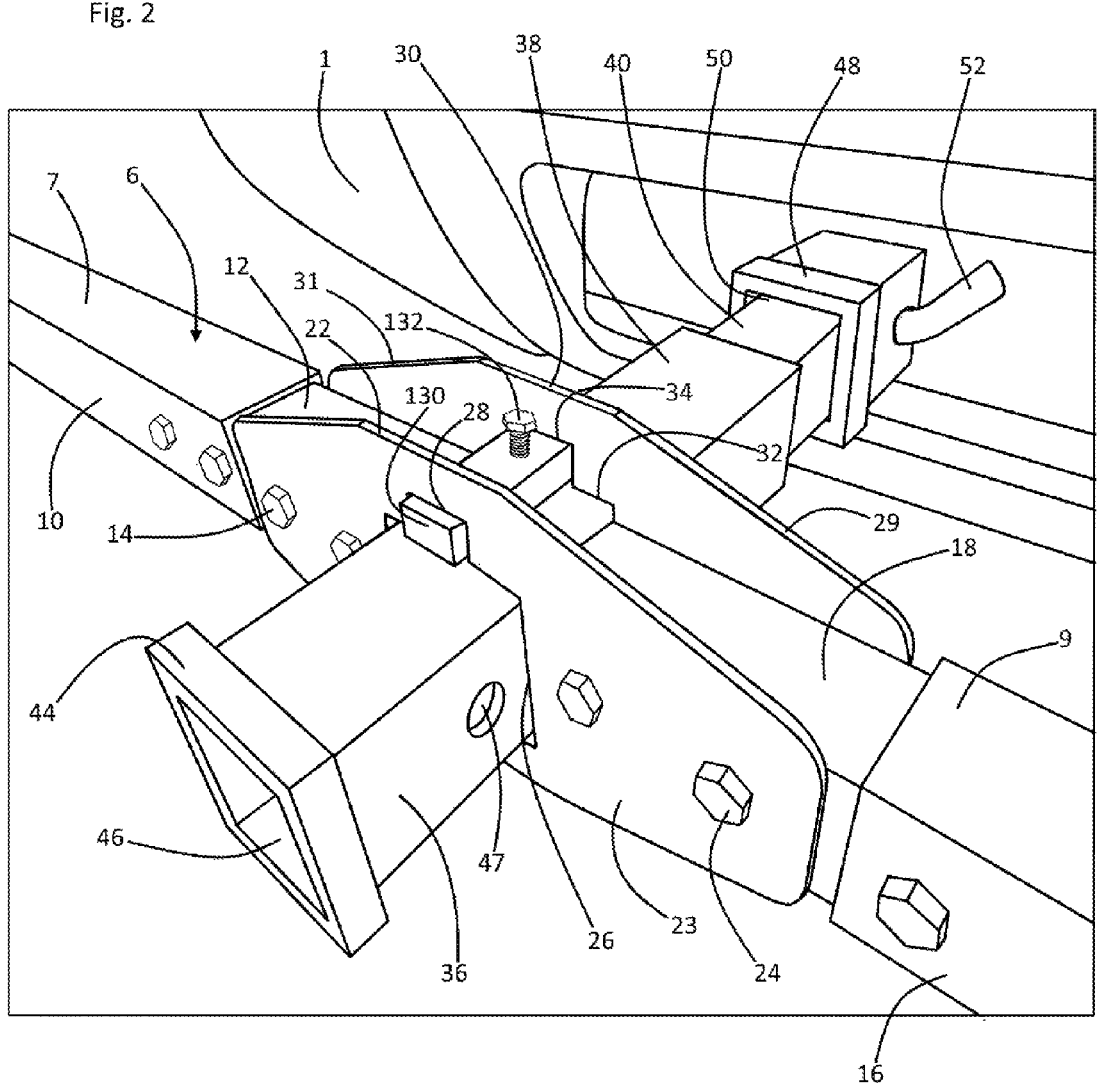
FIG. 2 is a magnified view of a portion of the structure depicted in FIG. 1.

Referring now to the drawings and in particular to Drawing FIGS. 1-3, a hitch extender component of the instant inventive tailgate party area covering assembly is referred to generally by Reference Numeral 36. The hitch extender 36 has a body 38, a longitudinal end (extending away from the viewer according to the view of FIG. 3), and has an oppositely longitudinal end (toward the viewer according to the view). The hitch extender's longitudinal end is preferably configured as a pin half 40 of a longitudinal pin and socket joint. The open socket 50 of a hitch receiver 48 mounted at the rear bumper of a vehicle 1 may comprise the socket half of such joint.

The oppositely longitudinal end of the hitch extender 36 is preferably configured as a socket half of a similarly configured oppositely longitudinal pin and socket joint, such socket half preferably being configured substantially identically with the square hollow bore 50 of the vehicle's hitch receiver 48. The pin 40 preferably has a laterally extending sheer pin receiving eye 42, and the hitch extender's oppositely longitudinally opening socket space 46 is similarly opened by sheer pin receiving eyes 44 positioned at the lateral and oppositely lateral walls of the hitch extender (the oppositely lateral sheer pin receiving eye not being within view). A socket lip reinforcing flange 49 is preferably fixedly welded to the extreme oppositely longitudinal end of the hitch extender 36, such flange 49 serving as a safety catch which prevents slippage of the assembly's laterally extending crossbar 6 rearwardly away from the vehicle 1.

The crossbar 6 has lateral and oppositely lateral ends, the lateral end of the bar 6 extending toward the viewer according to the view of FIG. 1, and the oppositely lateral end of the bar 6 extending away from the viewer. The bar 6 is preferably composed of steel square tubing having longitudinal and oppositely longitudinal faces or sides, the longitudinal side facing the vehicle 1, and the oppositely longitudinal side being toward the viewer according to the view of FIG. 1. Upwardly facing support lands 7 and 9 are also present, the function such lands being further discussed below.

Referring simultaneously to FIGS. 1-3, a further structural element of the inventive assembly comprises a hitch extender receiving channel having longitudinal and oppositely longitudinal openings. As indicated in FIG. 2, such channel is formed and defined by substantially square longitudinal and oppositely longitudinal apertures or voids 32 and 26 which are respectively positioned upon and open within plates 30 and 22, such plates being secured at the longitudinal and oppositely longitudinal sides or faces of the crossbar 6. In the preferred embodiment of the instant assembly, the body 38 of the hitch extender 36 is closely fitted to and is slidably and longitudinally extended through the channel's openings or voids 26 and 32. Oppositely longitudinal sliding motion of the bar 6 with respect to the hitch extender 36 is, as explained above, advantageously stopped by forward impingement of flange 49 against the peripheral edges of void 26.

Referring to FIGS. 1 and 4-6, the instant inventive assembly preferably further comprises lateral and oppositely lateral vertical support columns 2 and 4. For purposes of compactness of components during shipping, the vertical support columns 2 and 4 (along with each of the other elongated structural components of the assembly) are preferably segmented into half lengths. Following compact shipping, such segments are preferably substantially permanently interconnected by screw mounted coupling sleeves 70 and 76. In the preferred embodiment, the vertical support columns 2 and 4 are fixedly and alternatively removably attached to the lateral and oppositely lateral ends of the crossbar 6.

Referring simultaneously to FIGS. 1 and 7, the instant inventive assembly further comprises a frame and flexible sheet combination which is fixedly, and preferably both adjustably and removably, attached to the upper ends of the oppositely lateral and lateral support columns 2 and 4. The frame component of such combination is preferably substantially rectangular or square, and incorporates a lateral rail 80 and an oppositely lateral rail 86. For purposes of compactness in storage and shipping, such rails 80 and 86 are, like the columns 2 and 4, preferably segmented and are interconnected by sleeve joints 84 and 85.

Lateral rung components 114 and 118 of the combination's frame span between the rails 80 and 86, the rungs 114 and 118 similarly being segmented and fixedly interconnected by sleeve joints 116 and 122. As shown in FIG. 8, the extreme lateral and oppositely lateral ends of the rungs 114 and 118 are received within sockets 87 which open inwardly from the rails 80 and 86. Referring further to FIGS. 8 and 9, helically threaded set screw receiving eyes 83 overlie and align with the sockets 87, and finger turnable set screws 81 are received within such helically threaded eyes 83. Clockwise turning of such screws 81 securely holds the rungs 114 and 118 in their positions spanning laterally between rails 80 and 86.

The flexible sheet component 124 of the combination is preferably composed of canvas or woven fabric backed vinyl. To facilitate secure and easily removable attachment of the flexible sheet 124 upon the frame 80,86,114,118, "Velcro" hook pads 82,88, and 120 are preferably respectively attached to rails 80,86, and to rung 118. Correspondingly, "Velcro" loop pads 121,125, and 123 are respectively attached at the lateral, oppositely lateral, and oppositely longitudinal peripheral edges of the flexible sheet 124. As shown in FIG. 1, aligned interconnections between such Velcro hook pads and Velcro loop pads securely and removably attaches the flexible sheet 124 to the frame. The depicted "Velcro" fasteners constitute a preferred means for removably attaching the flexible sheet component 124 upon the frame. Notwithstanding, such "Velcro" fasteners are intended as being representative of other suitably substituted removably fastening means such as snap fasteners, zipper fasteners and bar enveloping hems.

Upon construction and assembly of structural elements discussed above as indicated in FIG. 1, the frame and flexible sheet combination advantageously shades a tailgate party area 150 situated directly to the rear of vehicle 1. The assembly's secure attachment to the vehicle's trailer hitch receiver 48 combined with secure ground support at column feet 72 and 78, advantageously holds the assembly in place during high winds.

Referring simultaneously to FIGS. 1 and 2, the crossbar component 6 is, like the assembly's columns, rails and rungs, preferably segmented or halved for purposes of compactness in storage and shipping. Accordingly, the crossbar preferably comprises a lateral segment 16, an oppositely lateral segment 10, and an interconnecting medial segment comprising the plates 22 and 30. Such bar medial segment 22,30 spans between and interconnects inner ends of the segments 10 and 16, the laterally and oppositely laterally extending ends of 22,29 and 21,31 of such plates advantageously forming and functioning as laterally and oppositely laterally extending attachment clevises. Such clevises 23,29 and 21,31 respectively receive the preferably pin configured inner ends 18 and 12 of the crossbar's lateral and oppositely lateral segments 16 and 10, such clevises and pins advantageously comprising lateral and oppositely lateral pin and clevis joints. Bolts 24 and 14 preferably extend through aligned eyes within the plates 22 and 30, and through eyes within the pin configured ends 18 and 12 for securely attaching the crossbar's lateral and oppositely lateral segments 16 and 10 to the medial segment.

Configuration of the assembly's crossbar 6 to include the longitudinally paired plates configured medial segment 22,30 advantageously allows the assembly's channel forming voids 26 and 32 to be positioned at and to centrally open at such plates. In a preferred embodiment of such plates, the upper peripheries of their voids 26 and 32 form downwardly opening "U" shaped receptacles 28 and 34 which respectively upwardly receive longitudinal and oppositely longitudinal ends of an expander block 130. Such block preferably has a vertically extending and helically threaded aperture which receives a set screw 132. Upon longitudinal extension of the hitch extender 36 through the channel forming voids 26 and 32, and upon upward receipt of the expander block 130 within receptacles 28 and 34, screw 132 may be engaged by a wrench (not shown within views). Clockwise turning of the screw 132 downwardly drives the lower end of the screw 132 against the upper face of the body 38 of the hitch extender 36, the screw turns simultaneously driving the block 130 upwardly in the manner of an expander within the receptacles 28 and 34. Such screw block expander action advantageously downwardly drives the lower face of the hitch extender body 38 against the channel's floor which is defined by the lower peripheries of the voids 26 and 32. The resultant expander actuated compressive forces securely clamp the crossbar 6 in place upon the hitch extender 36. While the crossbar 6 and hitch extender 36 interconnection depicted in FIG. 2 is preferred, such interconnecting assembly is considered as being representative of other commonly configured fasteners and joints which are capable of securely mounting the crossbar 6 upon the vehicle's hitch receiver 48, such as welded joints, "T" plate configured joints, and simple pin and socket joints.

Referring simultaneously to FIGS. 1 and 2, the instant assembly's means for removably attaching the oppositely lateral and lateral column members 2 and 4 to the oppositely lateral and lateral ends of the crossbar 6 preferably comprise "T" configured sleeve joints 56 and 54, each such joint preferably substantially mirroring the other joint in construction and configuration. Pin configured column portions 60 of the "T" joints 56 and 54 are preferably nestingly received within the hollow outer ends of the preferably square tubing configured crossbar segments 10 and 16, such pin components 60 being secured by bolt fasteners 62 which extend longitudinally through aligned eyes (not depicted within views).

Vertically extending series of pin receiving eyes 64 and 69 respectively extend through the sleeves 56 and 54, and through the columns 2 and 4. Such eyes 64 and 69 advantageously facilitate vertical adjustability of the downward extensions of the feet 78 and 72 of columns 2 and 4 from the crossbar 6. Such adjustable positioning of the columns 2 and 4 in relation to the ends of the crossbar 6 accommodates for ground level variations at the tailgate party site 150, and allows the column's feet 78 and 72 to securely seat upon the ground. Upon longitudinal alignments of the eyes among eye series 64 and 69, pins 66 may be extended longitudinally therethrough to secure the columns 2 and 4 upon the crossbar at an appropriate ground contacting extension. While the "T" configured slide sleeve joints 56 and 54 constitute preferred means for fixedly, removably, and adjustably attaching the columns 2 and 4 to the ends of the crossbar 6, such joints are considered as being representative of other suitably substituted joints such as plate mounts, simple pin and socket joints, and clevis bracket mounts.

Similarly with the attachments of the columns to the crossbar, the assembly's flexible sheet and frame combination component is preferably removably and adjustably attached to the columns' upper ends. Referring simultaneously to FIGS. 1 and 6, the instant inventive assembly preferably comprise means for such attachment which incorporate plate configured clevis brackets 87 and 106 which are respectively bolted to the upper ends of columns 2 and 4. The longitudinal end of frame rail 80 is preferably pivotally and removably attached to the clevis bracket 106 by means of a sheer pin 112 which extends laterally through aligned eyes 113 within the longitudinal end of the rail 80 and through the laterally paired plates of the clevis bracket 106. Frame rail is preferably similarly attached.

The sheet and frame combination attaching means preferably further comprise triangulating braces 75 and 94. The upper end of the lateral triangulating brace 94 is preferably removably secured to and mounted upon the frame rail 80 by means of a sheer pin 104 which extends laterally through aligned eyes 102 within the upper end of the brace 94 and the rail 80. The lower opposite end of the triangulating brace 94 is preferably configured as a telescoping extension shaft 92 whose extreme lower end is pivotally mounted upon the column 4 by means of a laterally extending bolt 96. Adjustment eyes 98 positioned in series along the triangulating brace 94 are provided so that a pair of such eyes 98 may be laterally aligned with an underlying pair of eyes (not within views) within the extension shaft 92. Upon a selected alignment of such eyes, sheer pin 100 may be extended laterally therethrough to fix the triangulating brace 94 at a desired shade angle controlling extension. Selective extensions and retractions of the triangulating brace 94 (and correspondingly of the oppositely lateral triangulating brace 75) advantageously allows the angular orientation of the assembly's flexible sheet and frame combination with respect to the support columns 2 and 4 to be pivotally moved to a desired area shading angle. Oppositely lateral triangulating brace and clevis bracket components which support the oppositely lateral end of the sheet supporting frame preferably substantially match and mirror the lateral components depicted in FIG. 6. While the clevis bracket and triangulating brace assemblies depicted in FIGS. 1 and 6 constitute preferred means for fixedly, removably, and adjustably interconnecting the assembly's flexible sheet and frame combination with the vertical support columns, such depicted joints are considered as being representative of other suitably substituted fasteners and joints such as locking hinges, "T" plate mounts, and pin and socket joints.

Referring simultaneously to FIGS. 1, 2, and 10, an exemplary auxiliary hitch receiver attachable component is referred to generally by Reference Arrow 137. As depicted, such auxiliary attachment 137 comprises a cargo rack or tray consisting of a rectangular frame 134, and under-girding support frame members 136 which forwardly extend a pin half 138 of a pin and socket joint, the socket half of such joint comprising the oppositely longitudinal opening 46 of the hitch extender 36. A sheer pin 51 extends laterally through eyes 44 within hitch extender 36 and through a laterally aligned underlying eye (not depicted within views) within the pin 138 for securely attaching such auxiliary component 132 as indicated in FIG. 10. The auxiliary component 137 is intended as being representative of various other auxiliary attachments to which may cantilever from the pin 138 such as a table, a tray, seat, or a cooker, such auxiliary components being deployed and used within the tailgate party area 150 while being advantageously shaded by the overlying flexible sheet and frame combination.

Referring simultaneously to FIGS. 5 and 11, the length of the lateral span of the crossbar 6 is preferably substantially equal to the lengths of columns 2 and 4, the rails 80 and 86, and the rungs 116 and 118. Such matched lengths of the assembly's elongated structural components advantageously allows for storage of the components within a durable cloth bag or sleeve 140, such components to be received and secured therein.

Referring simultaneously to FIGS. 1, 2, and 11, the upper faces or lands 7 and 9 of the crossbar's oppositely lateral and lateral segments 10 and 16 advantageously provide bearing surfaces for stored rear vehicle carriage of the assembly's column, rail, and rung components. In order to releasably attach the sleeve 140 with its column, rail, and rung contents to the crossbar 6, a series of strap fastener 142 and buckle 141 combinations are preferably provided for securely strapping sleeve 140 onto the crossbar 6. While the depicted strap and buckle combinations 142 and 141 constitute a preferred means for releasably attaching at least the support columns 2 and 4, and preferably additionally the shade frame's rail and rung components, to the crossbar's upper faces or lands, such straps are intended as being representative of other suitably substituted releasable fastening means such as annular clamps, and shock cord or "bungee" cord fasteners.

Upon compactly configuring the instant inventive assembly as depicted in FIG. 11, the shade frame components of the inventive assembly are conveniently and compactly stored for over-the-road carriage, while the load tray configured auxiliary component 132 (which formerly functioned as a table within the shaded tailgate party area 150) may advantageously simultaneously perform an excess cargo carrying function. Alternatively, a ball hitch auxiliary component (not depicted within views) may be mounted within the socket 46 of the hitch extender 36, and a trailer or boat may thereby be towed by the vehicle 1.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope at least commensurate with the appended claims.

The invention hereby claimed is:

1. A tailgate party area covering assembly comprising:
   (a) a hitch extender having longitudinal and oppositely longitudinal ends;
   (b) a bar comprising medial, lateral, and oppositely lateral segments, the bar having lateral and oppositely lateral ends, the bar further having longitudinal and oppositely longitudinal sides, wherein the bar's medial segment comprises lateral and oppositely lateral clevis brackets, said brackets respectively engaging the bar's lateral and oppositely lateral segments;
   (c) longitudinal and oppositely longitudinal plates having lateral and oppositely lateral ends, the bar's medial segment comprising said plates, wherein the lateral clevis bracket comprises said plates' lateral ends, and wherein the oppositely lateral clevis bracket comprises said plates' oppositely lateral ends;
   (d) a channel having longitudinal and oppositely longitudinal openings respectively positioned at the bar's longitudinal and oppositely longitudinal sides, wherein the channel's longitudinal opening comprises a longitudinal void within the longitudinal plate, wherein the channel's oppositely longitudinal opening comprises an oppositely longitudinal void within the oppositely longitudinal plate, and wherein the hitch extender is received within the channel;
   (e) lateral and oppositely lateral columns having upper ends, said columns being respectively fixedly attached to the bar's lateral and oppositely lateral ends; and
   (f) a frame and flexible sheet combination fixedly attached to the lateral and oppositely lateral columns' upper ends, wherein the channel has a floor, and further comprising an expander operatively spanning between the hitch extender and the longitudinal and oppositely longitudinal plates, the expander being adapted for driving the hitch extender against said floor.

2. The tailgate party area covering assembly of claim 1 wherein the longitudinal and oppositely longitudinal voids respectively form longitudinal and oppositely longitudinal receptacles, and wherein the expander comprises a block and set screw combination, said combination's block being nestingly received within the longitudinal and oppositely receptacles.

3. The tailgate party area covering assembly of claim 1 wherein the hitch extender comprises longitudinal and oppositely longitudinal pin and socket joint halves, said longitudinal joint half comprising a pin, and said oppositely longitudinal joint half comprising a socket.

4. The tailgate party area covering assembly of claim 3 wherein the socket is substantially square, and further comprising a slide stop fixedly attached to the hitch extender's oppositely longitudinal end.

5. The tailgate party area covering assembly of claim 4 wherein the hitch extender has lateral and oppositely lateral sides, and further comprising lateral and oppositely lateral eyes, said eyes respectively opening the socket at said sides.

6. The tailgate party area covering assembly of claim 5 comprising a second oppositely longitudinal pin and socket joint half, said joint half comprising a second pin having a laterally extending eye and an oppositely longitudinal end, said pin being nestingly received within the socket; comprising a shear pin extending laterally through the hitch extender's lateral and oppositely lateral eyes and through the second pin's laterally extending eye; and comprising an auxiliary component selected from the group consisting of ball hitches, cargo support shelves, cargo support racks, seats, tables, and cookers, said auxiliary component being fixedly attached to said oppositely longitudinal end.

* * * * *